United States Patent [19]

Wakeman et al.

[11] Patent Number: 5,108,259

[45] Date of Patent: * Apr. 28, 1992

[54] FLEXIBLE CONNECTOR FOR USE IN AIRCRAFT

[75] Inventors: Thomas G. Wakeman, Lawrenceburg, Ind.; Ambrose A. Hauser, Wyoming, Ohio

[73] Assignee: General Electric Company, Cincinnati, Ohio

[*] Notice: The portion of the term of this patent subsequent to Jan. 21, 2009 has been disclaimed.

[21] Appl. No.: 286,101

[22] Filed: Dec. 19, 1988

[51] Int. Cl.$^5$ .................. B64C 11/00; B64C 27/00
[52] U.S. Cl. .................................. 416/135; 416/126; 415/135
[58] Field of Search ............. 416/135 R, 129 R, 171, 416/126, 190, 130; 415/135, 62, 69; 60/226.1, 268, 39.162; 403/291

[56] References Cited

U.S. PATENT DOCUMENTS

| | | | |
|---|---|---|---|
| 2,410,804 | 11/1946 | Baumann | 416/129 R X |
| 2,411,124 | 11/1946 | Baumann | 416/171 X |
| 2,505,660 | 4/1950 | Baumann | 416/129 X |
| 2,514,408 | 7/1950 | Mierley | 416/171 |
| 2,541,098 | 2/1951 | Redding | 170/135.7 |
| 2,918,316 | 12/1959 | Runton et al. | 288/17 |
| 2,971,745 | 2/1961 | Warren et al. | 253/77 |
| 3,070,284 | 12/1962 | Kent | 416/171 |
| 3,373,928 | 3/1968 | Erwin et al. | 230/116 |
| 3,545,884 | 12/1970 | Schroeter et al. | 416/205 |
| 3,711,791 | 5/1974 | Cotton | 416/129 |
| 3,768,933 | 10/1973 | Bouiller et al. | 417/408 |
| 3,799,698 | 3/1974 | Haworth | 416/204 |
| 3,811,791 | 5/1974 | Cotton | 416/129 |
| 4,412,783 | 11/1983 | Barlass | 416/186 |
| 4,422,828 | 12/1983 | Sambell | 416/135 |
| 4,657,484 | 4/1987 | Wakeman | 416/127 |
| 4,762,466 | 8/1988 | Bouiller et al. | 416/230 X |
| 4,767,271 | 8/1988 | Catlow | 416/129 |
| 4,815,273 | 3/1989 | Rudolph et al. | 416/171 |
| 4,817,382 | 4/1989 | Rudolph et al. | 416/129 X |
| 4,863,352 | 9/1989 | Hauser et al. | 416/204 R |

FOREIGN PATENT DOCUMENTS

| | | |
|---|---|---|
| 2109530 | 5/1972 | France . |
| 259068 | 10/1926 | United Kingdom . |
| 344478 | 3/1931 | United Kingdom . |
| 374650 | 6/1932 | United Kingdom . |
| 439620 | 12/1935 | United Kingdom . |
| 441742 | 1/1936 | United Kingdom . |
| 586557 | 3/1947 | United Kingdom ............. 416/129 |
| 755527 | 8/1956 | United Kingdom . |
| 1061370 | 3/1967 | United Kingdom . |
| 1071101 | 6/1967 | United Kingdom . |
| 1549001 | 7/1979 | United Kingdom . |
| 1595634 | 8/1981 | United Kingdom . |
| 2169033 | 7/1986 | United Kingdom . |
| 2176246 | 12/1986 | United Kingdom . |

Primary Examiner—Edward K. Look
Assistant Examiner—Hoang Nguyen
Attorney, Agent, or Firm—Jerome C. Squillaro; John R. Rafter

[57] ABSTRACT

The invention concerns a connector, in an aircraft engine, for mounting a ring to a turbine rotor which the ring surrounds. The ring carries propeller blades, and the connector transmits both thrust and torque loads between the ring and the rotor, without significant deformation. However, the connector does deform in order to accommodate differential thermal growth between the ring and the rotor.

21 Claims, 9 Drawing Sheets

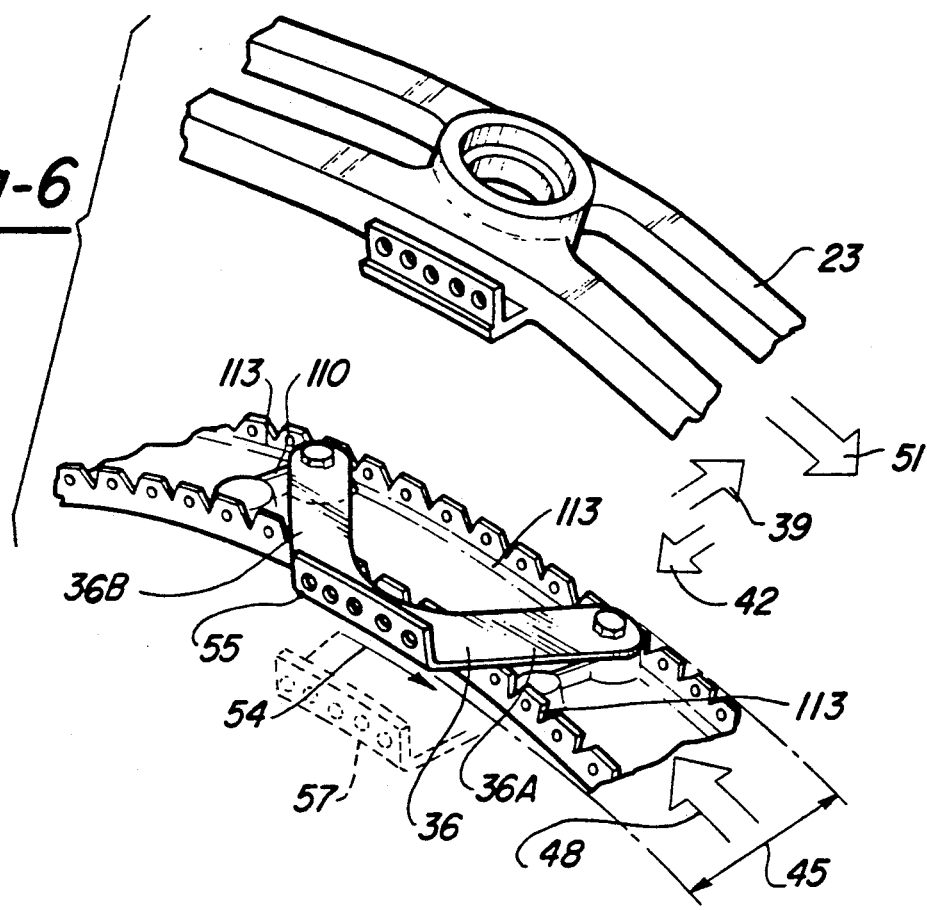
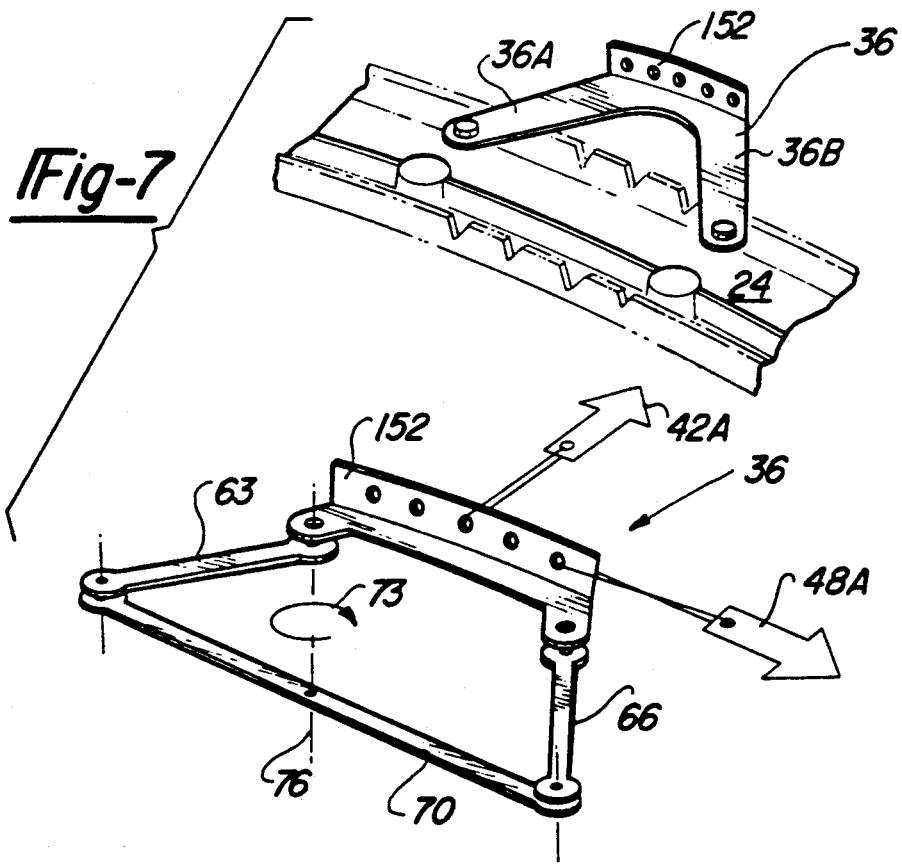

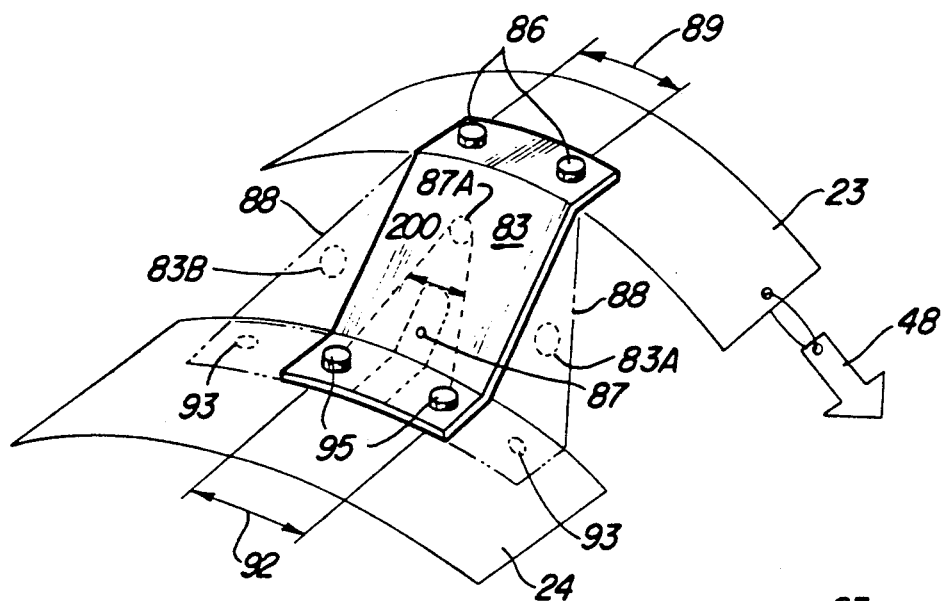
_Fig-8_
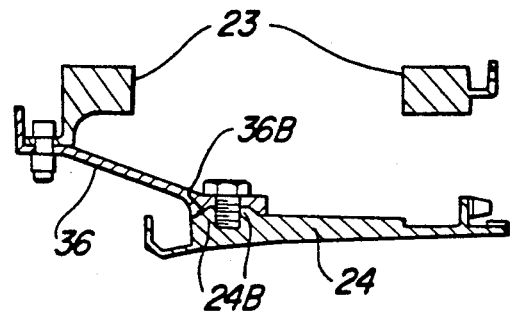
_Fig-9_
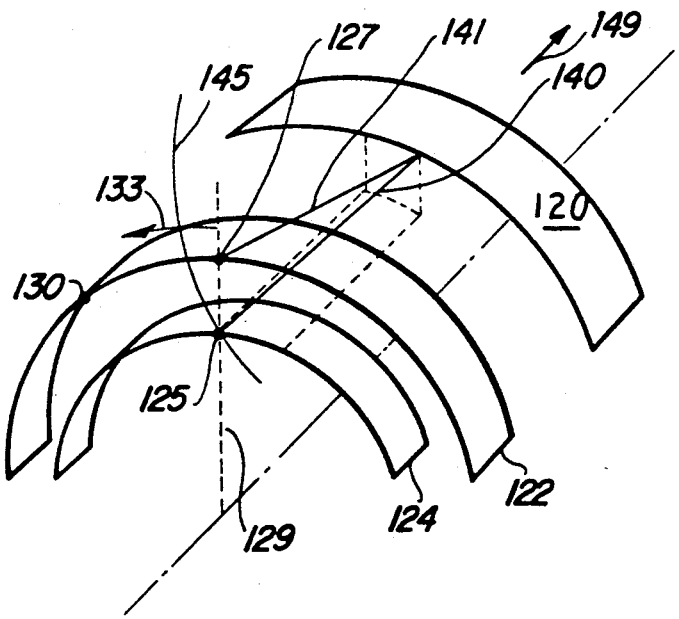
_Fig-10_

FLEXIBLE CONNECTOR FOR USE IN AIRCRAFT

The invention herein described was made in the performance of work under a NASA contract and is subject to the provisions of Section 305 of the National Aeronautics and Space Act of 1958, Public Law 85-568 (72 Stat. 435; 42 USC 2457).

The invention is used to connect a ring, which carries an array of aircraft propeller blades, to a turbine stage which the ring surrounds. The turbine stage experiences wider temperature swings than does the ring, and therefore relative thermal growth occurs between the ring and the turbine. The invention fastens the ring to the turbine, yet accommodates the relative thermal growth.

BACKGROUND OF THE INVENTION

FIG. 1 illustrates an aircraft powered by a counterrotating propulsion system 2 which is of the unducted fan type. FIG. 2 illustrates the propulsion system in schematic cross-sectional form. A high-energy gas stream 6 is provided by a gas generator (not shown) and drives counterrotating turbines 9 (hatched) and 12 (not hatched) in opposite rotational directions. Counterrotating turbines 9 and 12 are directly connected to propellers 15 and 18, (also shown in FIG. 1), causing the propellers to rotate and provide thrust.

Region 21 in FIG. 2 is shown in greater detail in FIG. 3, wherein turbine stage 24A is shown, and in schematically as a hoop 22. (The ring is not actually in the form of hoop 22, as will be explained later in the specification.) The casing 24 of the turbine stage 24A experiences a wide swing in temperature. The temperature can range from an ambient temperature of, for example, 70 degrees fahrenheit during engine shutdown to 1,200 degrees fahrenheit during takeoff However, the ring 22 experiences a much smaller excursion in temperature, for example, between ambient temperature and about 400 degrees fahrenheit during flight.

In addition, the ring 22, the casing 24, and other components of the turbine stage 24A stretch because of centrifugal force. However, the ring 22 stretches significantly more because the ring carries the centrifugal load of the blades 15.

This differential in temperature swings, together with the differential in centrifugal loading, causes distance 27 between the turbine casing 24 and the ring 22 to change. The inventors have found that distance 27 can change as much as 0.090 inches. This relative change in diameters between the turbine casing 24 and the ring 22 presents a problem in fastening the ring 22 to the turbine stage 24A, inasmuch as the fastener must accommodate the change in distance 27.

OBJECTS OF THE INVENTION

It is an object of the present invention to provide an improved system for fastening aircraft propellers to a turbine.

SUMMARY OF THE INVENTION

In one form of the invention, an array of aircraft propellers is carried by a ring. The ring surrounds, and is attached to, a rotor, which can take the form of a turbine. Because of relative thermal growth between the ring and the rotor, the distance between them changes The invention connects the ring to the rotor and transmits both thrust and torque loads between the two without significant deformation. However, the invention does undergo significant deformation in response to the differential thermal growth.

BRIEF DESCRIPTION OF THE DRAWING

FIG. 6 illustrates circled region 45 in FIG. 4 in more detail, and in which a ring section 23 replaces hoop 22 in FIG. 5.

FIG. 7 illustrates a bracket 36 and a linkage 63 which can be used to visualize the loading upon bracket 36.

FIG. 8 illustrates a flat plate 83 which could replace bracket 36.

FIG. 9 illustrates one system for mounting bracket 36 to casing 24.

FIG. 10 illustrates thermal growth of casing from shell 124 to shell 122 and shows the resulting compression of link 140 to shorter link 141 which tends to occur.

DETAILED DESCRIPTION OF THE INVENTION

Figure 4:
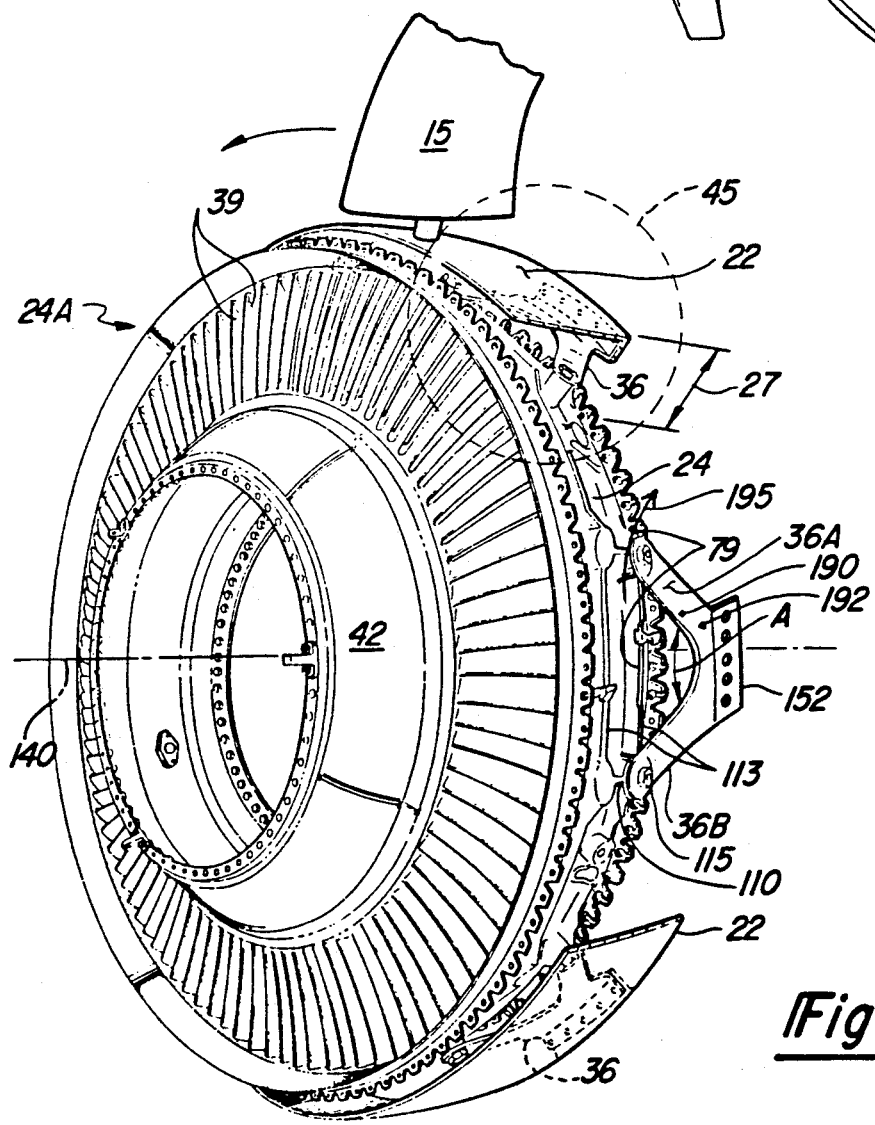
FIG. 4 illustrates in more detail the turbine stage of FIG. 3, showing a ring 22 which carries propeller blades 15. One form of the invention is shown as bracket 36, which connects the ring 22 to the turbine stage 24A.

FIG. 4 illustrates one form of the invention in which brackets 36 are connected between hoop 22 and a rotor, which takes the form of turbine stage 24A. Hoop 22 is a schematic representation, and the actual structure used is a polygonal ring 23 shown in FIG. 5.

Figure 2:
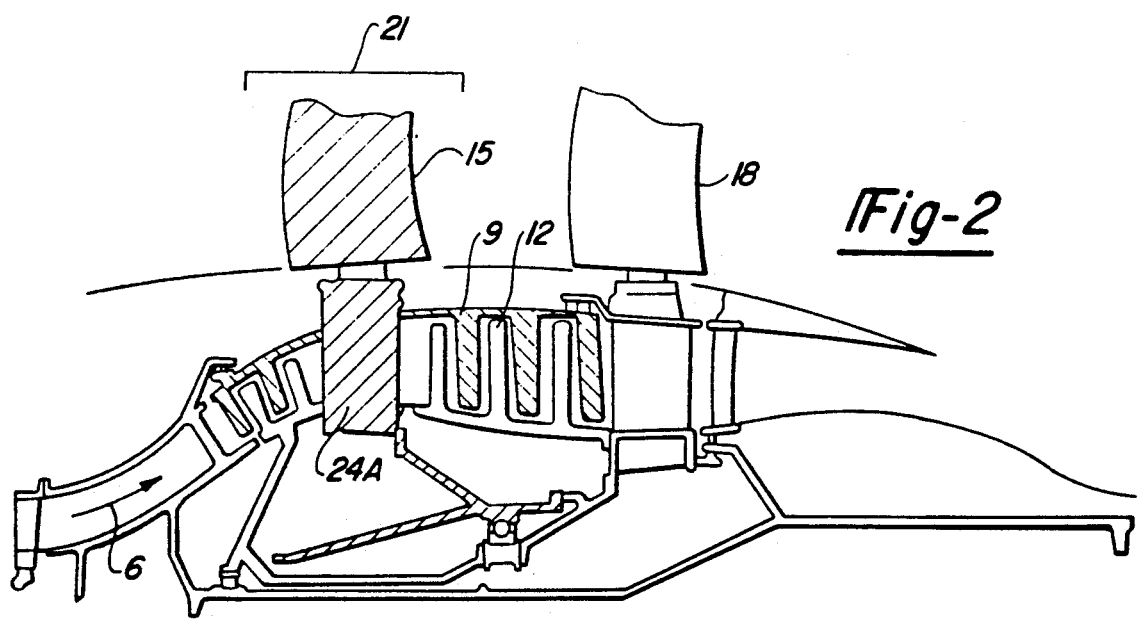
FIG. 2 is a schematic cross section of a counterrotating turbine which directly drives the propellers of FIG. 1.
Figure 5:
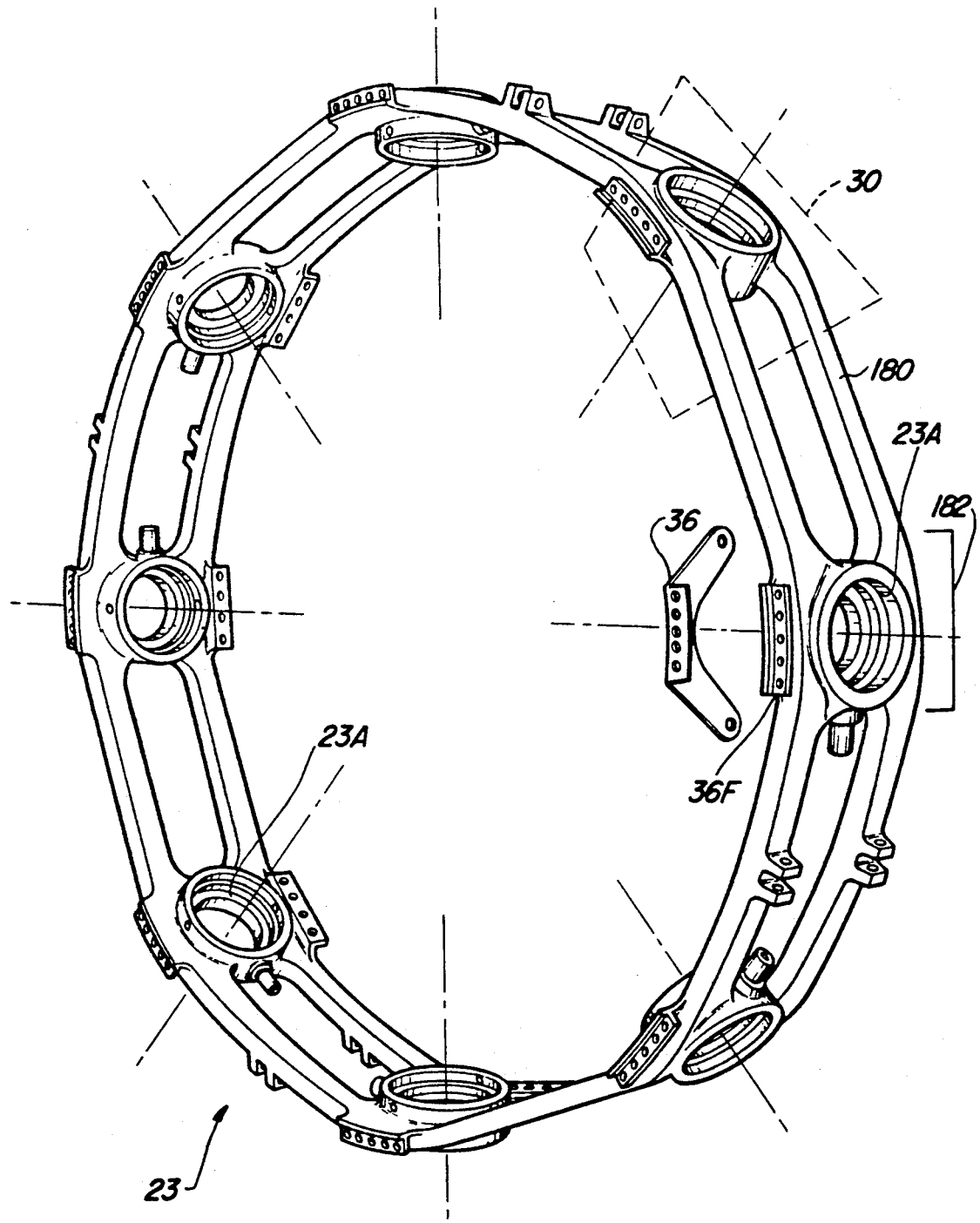
FIG. 5 illustrates the actual configuration of the ring which carries the propeller blades 15 and 18, the ring being shown schematically as hoop 22 in FIG. 4.
Figure 5A:
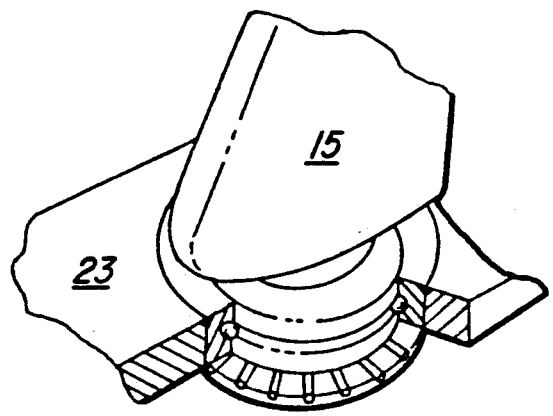
FIGS. 5A and 5B illustrate the mounting of variable-pitch propeller blades upon ring 23 in FIG. 5.
Figure 5B:
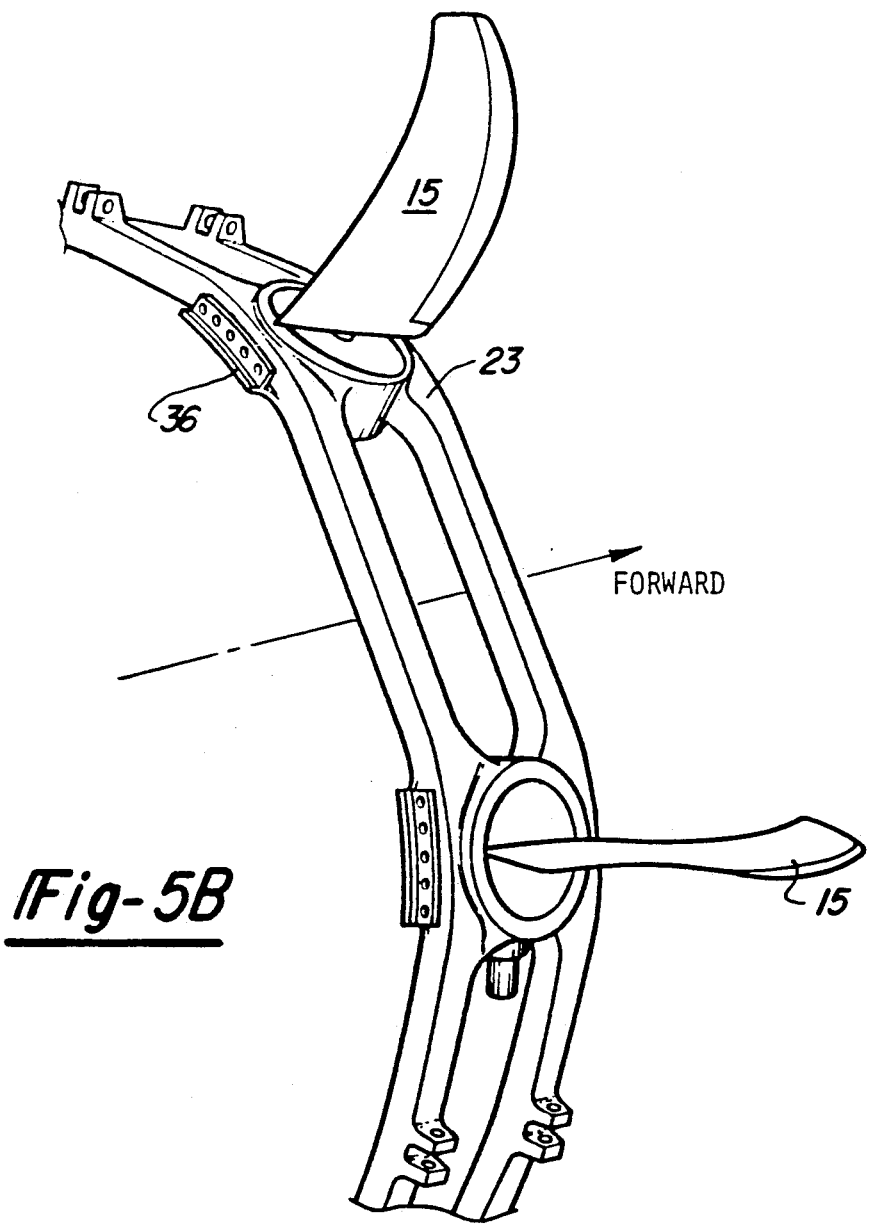

Propeller blades 15 and 18 in FIG. 2 are supported in bearing races 23A in FIG. 5. This method of support is illustrated in FIGS. 5A and 5B, which are considered self-explanatory. Brackets 36 in FIG. 4 attach to flanges 36F in FIG. 5.

Turbine blades 39 in FIG. 4 are connected to both inner barrel 42 and the turbine casing 24, thereby acting as a web which makes the turbine stage 24A behave as a stiff unit. Circled region 45 is shown in more detail in FIG. 6. However, in FIG. 6, the hoop 22 of FIG. 4, which is a schematic representation, is replaced with a section of the polygonal ring 23 of FIG. 5, which is the structure actually used.

Figure 3:
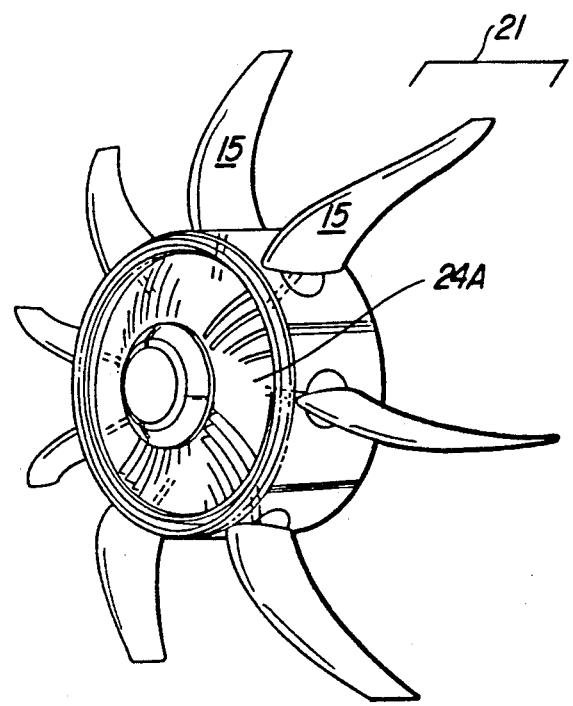
FIG. 3 illustrates, in perspective view, stage 24A of one of the turbines, together with propeller blades 15.

Three types of loading to which the brackets 36 in FIG. 6 are subject will now be considered. A first type is the thrust loading provided by propeller blades 15 in FIG. 3. Ring 23 in FIG. 5, shown as hoop 22 in FIG. 4, carries the propeller blades 15 in races 23A and, during forward flight, thrust produced by the propellers acts as indicated by arrow 42 in FIG. 6. Under this thrust load, legs (or fingers) 36A and 36B of bracket 36 are placed in tension and transmit the thrust load to the turbine casing 24, which provides a reactive force indicated by arrow 39. The elongation experienced by bracket 36 under this load, that is, the change in dimension 45, was found to be approximately 0.003 inches, in a situation wherein 16 brackets (eight brackets on each of two turbines) carried a total thrust load of approximately 20,000 pounds, or approximately 1,250 pounds per bracket.

A second type of loading carried by the brackets 36 is termed torque loading. A force, indicated by arrow 48, must be applied to the turbine casing 24 (and thence to the propellers blades via brackets 36) in order to rotate the propellers. However, the aerodynamic loading of the propeller blades tends to resist rotation, applying a reactive force indicated by arrow 51. This pair of forces applies a torque load to bracket 36. The inventors have found that when the force indicated by arrow 51 is of the order of 10,000 pounds, and, again, when eight brackets per rotor were used, each bracket deformed in the direction of arrow 54 by a distance of approximately 0.003 inches. That is, point 55 moved 0.003 inches rightward, in the direction of arrow 54, with respect to casing 24.

A third type of loading results from the relative thermal growth of the turbine casing 24 compared with the growth of the ring 23. As discussed in the Background of the Invention, the turbine casing can experience significantly higher temperatures and loads than does the hoop 22 (i.e., ring 23 in FIG. 5) in FIG. 4. Accordingly, the diameter of the casing 24 in FIG. 4 increases more than the does diameter of hoop 22, thereby reducing the distance between the two, indicated by dimension 27. The inventors have found that this distance can change by as much as 0.090 inches. The brackets 36 accommodate this change in dimension 27 by deflecting into a representative phantom position 57 shown in FIG. 6. The deflection accommodates the change in dimension 27 in FIG. 4.

Several important aspects of the invention are the following:

(1) As shown in FIG. 7, the turbine casing 24 can be viewed as acting as part of bracket 36. That is, bracket 36 can be viewed as including two bracket links 63 and 66, corresponding to legs 36A and 36B in FIG. 4, while casing 24 can be viewed as providing a third, casing link 70, thereby forming a trapezoid, and resembling a triangle. The thrust load, indicated by arrow 42A, places bracket links 63 and 66 in tension, while placing the casing link 70 into compression. The torque load, indicated by arrow 48A, places link 63 in tension, link 66 in compression, and causes a moment, indicated by circular arrow 73, in casing link 70 about axis 76. Of course, the moment is resisted in fact by the attachment of rib 79 in FIG. 4 to casing 24, rib 79 corresponding to casing link 70 in FIG. 7.

(2) One alternate embodiment of the invention could be that shown in FIG. 8, wherein a rectangular plate 83 extends between the casing 24 and the ring 23. In this embodiment, bolts 86 are separated by a distance 89 which is about equal to distance 92 separating bolts 95 which attach plate 83 to the casing 24. In this embodiment, the torque loading upon the plate 83 is largely a shear load. However, with the bracket 36 in FIG. 4, shear load is reduced, with link 66 in FIG. 7 placed into compression and link 63 placed in tension. Bracket 36, in a sense, is plate 83 in FIG. 8, but with region 87 removed.

However, unlike rectangular plate 83, bracket 36 more resembles in behavior a trapezoidal plate indicated by phantom lines 88 and attached to casing 24 at points 93. The torque loading on a trapezoidal plate is reduced in shear, but increased in tension and compression. For example, with a torque load induced by force 48 applied to ring 23, region 83A is placed in compression and region 83B is placed in tension. If the trapezoidal plate 88 of FIG. 8 were used, having region 87 intact, the separation of points 93 which occurs upon expansion would cause plate 88 to stretch in region 87 and possibly buckle in region 87A. Removal of region 87 allows bracket 36 to deform as described in point (3), below.

Nevertheless, even though the shear load is reduced by making plate 83 in a trapezoidal shape, plate 83 still must tolerate the thermal expansion of stage 24A in FIG. 4.

(3) When the turbine casing 24 experiences thermal expansion, in which the diameter increases, the circumference also increases, increasing the distance 92 between the bolts 95 in FIG. 8. Bracket 36 in FIG. 4 accommodates this increase by deforming: angle A becomes greater.

(4) As shown in FIG. 9, a conical region 24B on the casing 24 mates with a recess 36B in the bracket 36 in order to reduce slippage. This attachment will reduce fretting and wear during operation.

(5) As shown in FIGS. 4 and 6, casing 24 contains ribs 110 and 113 which reinforce the points of attachment of bracket 36. Rib 110 resists axial forces applied at attachment point 115 while rib 113 resists the tangential forces.

(6) The brackets 36 serve to maintain hoop 22 in FIG. 4 in a coaxial condition with respect to turbine stage 24A. That is, while each bracket is free to deform into phantom position 57 shown in FIG. 6, the deflection predominantly is of each link 36A and 36B in the radial direction, with very small components in the axial directions.

This radial predominance is illustrated in FIG. 10. Shell 120 represents polygonal ring 23, while the pair of shells 122 and 124 represent the turbine casing 24.

In the pair, inner shell 124 represents the casing 24 in its low-temperature state, while outer shell 122 represents the casing in its high-temperature, expanded state. It is important to observe that, during expansion, all points on the casing travel radially outward. That is, for example, a reference mark at point 125 will follow radial line 129 during expansion and come to rest at point 127 which is radially outward of original point 125. There is no tangential movement, as there would be if the mark moved from point 125 to point 130. The tangential component of such movement is illustrated by arrow 133.

Links 140 and 141 in FIG. 10 represent leg 36A or 36B of bracket 36 in FIG. 4. The legs do not change in length appreciably with changes in temperature. Consequently, when the casing expands, the attachment point 125 moves to point 127, on outer shell 122, along straight line 129. However, the end of link 140 wishes to travel along circumference 145 of which link 140 itself is a radius. From the drawing, one sees that link 141 is shorter than link 140. Therefore, link 141 tends to compress.

However, since brackets 36 are the principal attachment between hoop 22 and casing 24, the links are not actually compressed, but hoop 22 moves very slightly in the axial direction, direction 149, with respect to casing 24, upon expansion of the casing 24.

Figure 11:
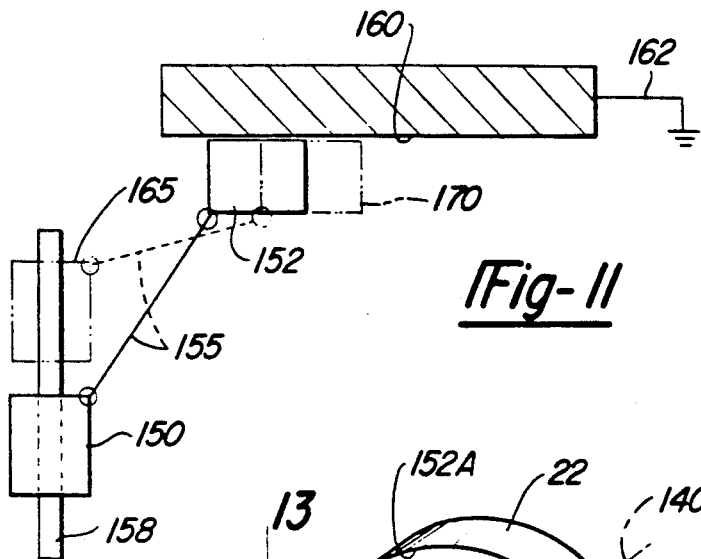
FIG. 11 is a simplified sketch illustrating the events of FIG. 10.

A more simplified explanation of the axial motion 149 of hoop 22 is shown in FIG. 11. In that Figure, block 150 is linked to block 152 by link 155. Block 150 moves along rod 158, while block 152 can slide along surface 160, which is immovable, as indicated by ground symbol 162.

When block 150 moves to phantom position 165, analogous to the motion of attachment point 125 to point 127 in FIG. 10, other block 152 is forced to move to phantom position 170 by link 155, analogous to the axial motion of hoop 22 indicated by arrow 149 in FIG. 4.

Figure 12:
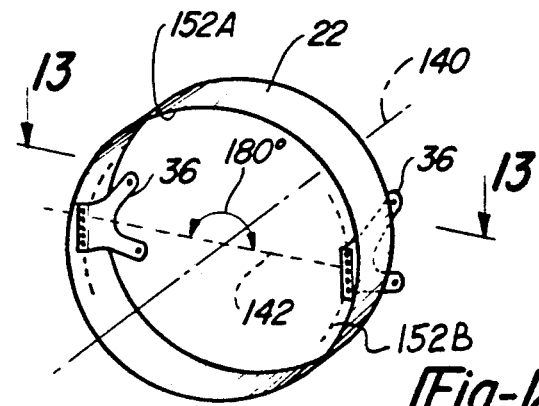
FIGS. 12, 13, and 14 illustrate the de-centering of ring 22 which can occur when brackets 36 are mounted 180 degrees apart.
Figure 13:
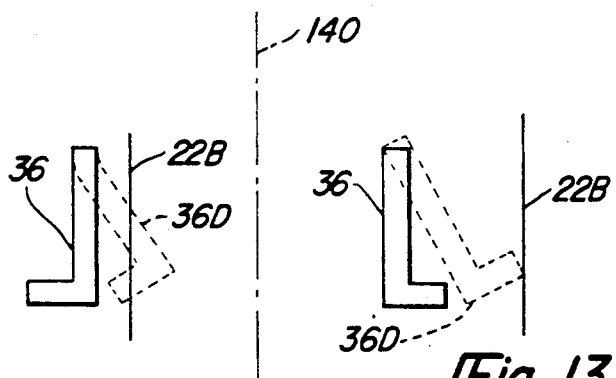

The self-centering aspect mentioned above will now be explained. FIG. 12 shows two brackets 36, 180 degrees apart. FIG. 13 is a cross-sectional view of FIG. 12, taken along lines 13—13. Clearly, the deformation of the brackets, indicated by phantom brackets 36D in FIG. 13, will allow hoop 22 to move to position 22B and become de-centered with respect to centerline 140. One reason is that brackets 36 allow only radial displacement to occur between casing 24 and hoop 22 in FIG. 4. Restated, in FIG. 12, the 180 degree separation between brackets 36 allows the radii along which motion is allowed to coincide on line 142, thus allowing a gross movement of hoop 22 with respect to center 140 as shown in FIG. 13.

However, placement of the brackets 36 such that the radii, along which motion is allowed, do not coincide prevents gross movement of hoop 22 with respect to centerline 140. Distributing eight brackets, separated by 45 degrees along casing 24, is such a placement. A simplified example will illustrate this, with reference to FIG. 14.

Figure 14:
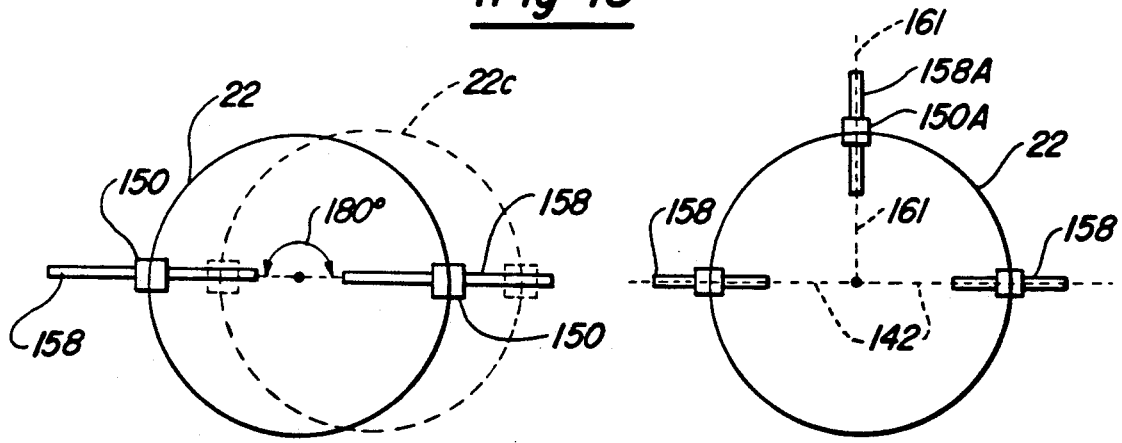

As in FIG. 11, blocks 150 can slide along rods 158. If rods are 180 degrees apart as shown in FIG. 14, hoop 22 fastened to block 150 can move as shown into phantom position 22C, thereby becoming de-centered.

Figure 15:
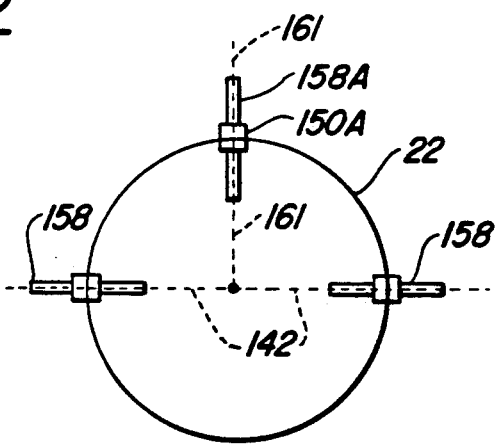
FIG. 15 illustrates how the invention prevents the de-centering shown in FIGS. 12-14.

However, if another rod 158A and block 150A are added in FIG. 15, and the "radius" 161 of rod 158A does not coincide with the "radii" 142 of rods 158, then gross displacement of hoop 22 is prevented. Therefore, the brackets 36, by each allowing only radial movement (i.e., along radii 142 and 161 in FIG. 15) between casing 24 and hoop 22, maintain hoop 22 in FIG. 4 centered about axis 140. Proper centering is important in order to maintain dynamic balance of the rotating system.

Figure 16:
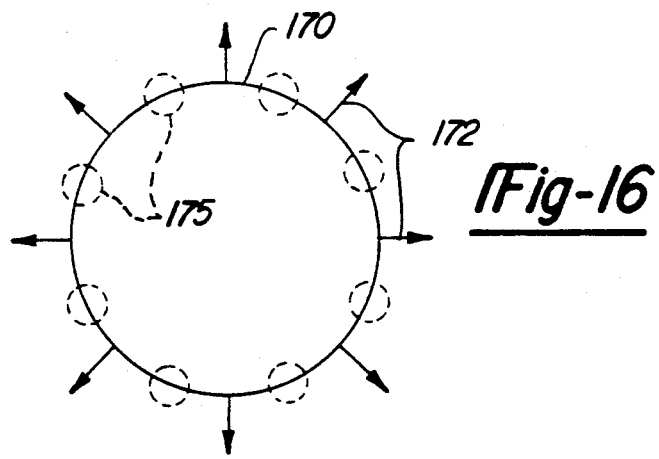
FIGS. 16-18 illustrate the deformation of ring 170 which can occur if brackets 36 are not located radially inward of propeller blades.
Figure 17:
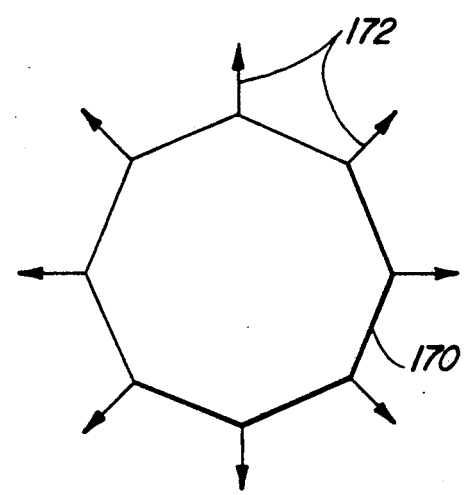
Figure 18:
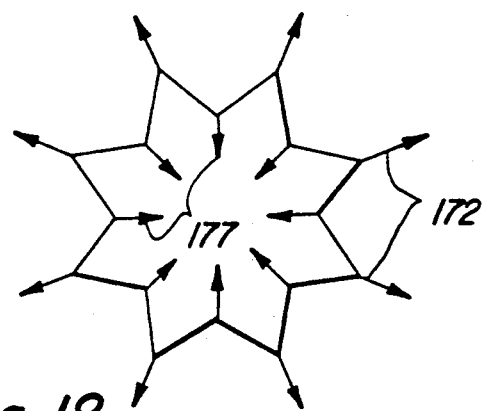

(7) Each bracket 36 is located radially inward of a blade and fastened to a mounting flange 36F in FIG. 5, located next to bearing races 23A. One reason for this manner of locating the brackets is explained with reference to FIG. 16. In that figure, ring 23 in FIG. 5 is illustrated as circle 170. Arrows 172 indicate the centrifugal load applied by propeller blades 15. These loads can be quite large, of the order of twenty or thirty tons for each blade. The centrifugal loading of the blades is carried by the ring as a hoop stress. The loading of the propeller blades tends to deform the formerly circular ring into the polygonal shape shown in FIG. 17, with the apexes of the polygon located at the points of blade attachment. If the brackets 36 in FIG. 4 were not located beneath the blades, but located between blades, namely, at regions 175 in FIG. 16, it is believed that the ring would deform into a shape resembling that shown in FIG. 18, wherein arrows 177 indicate the radially inward forces applied by the brackets, and arrows 172 indicate the blade load forces. Deformation into the shape of FIG. 18 is not desirable. Restated, the slender ring elements 180 in FIG. 5 which run between blade mounting locations 182 are intended to carry hoop stress only (i.e., are intended to carry a tension load), and not to carry loads as indicated by arrows 172 and 177 in FIG. 18.

An invention has been described wherein an annular carrier in the form of a polygonal ring carries an array of aircraft propeller blades. One such polygonal ring is described in the U.S. patent application entitled "Blade Carrying Means," Ser. No. 667,663, filed on Nov. 2, 1984, by Hauser, Strock, Morris and Wakeman, now U.S. Pat. No. 4,863,352, issued Sep. 5, 1989, which is hereby incorporated by reference. The polygonal ring surrounds a turbine stage (or rotor), and there exists an annular space between the turbine stage and the polygonal ring in order to accommodate thermal growth between the turbine stage and the polygonal ring. The invention fastens the ring to the turbine stage, while accommodating this thermal expansion. From one point of view, the invention is a cantilevered bracket, resembling a leaf spring pair, and having the cantilevered region fastened to the ring, the cantilevered region being allowed to bend during thermal growth.

Legs 36A and 36B in FIG. 4 can be viewed as the leaf springs. These legs are mounted on a circumference of the casing defined generally by circumferential rib 113 in FIGS. 4 and 6. The leaf springs resist compression, i.e., shortening of the distance between points 190 and 192 on leg 36A in FIG. 4. Further, the flange 152 and bracket 36, when the bracket 36 is mounted to the ring 23, provide an anchor which resists rotation indicated by arrow 195. (Flanges 152 lie upon another circumference 152B, shown in FIG. 12, and this circumference 152B axially coincides approximately with an edge 152A of ring 22.) The restrain against this compression and rotation nevertheless allows deflection by the leaf spring legs as shown by phantom bracket 57 in FIG. 6.

Viewed another way, each bracket is a spring system having a high spring rate resisting compression, a high spring rate resisting rotation shown by arrow 195 in FIG. 4, but a low spring rate for resisting the deformation into phantom position 57 in FIG. 6. This latter, low spring rate allows the relative radial movement between casing 24 and ring 23.

The points of attachment of brackets are schematically shown in FIG. 8 as bolts 95 which lie on a circumference definable on casing 24 and bolts 86 which lie along a circumference on ring 23. The brackets are V-shaped, with the apex of the V located near bolts 86, and the legs of the V each fastened to a bolt 95.

From another point of view, region 87A is a web, while the cutout region 87 forms the legs fastened by bolts 95. During thermal expansion of casing 24, the increase in distance 92 between bolts 95 is greater than the increase in distance 200, located near the web 87A. The material can tolerate the increase in distance 200 without damage.

Figure 19:
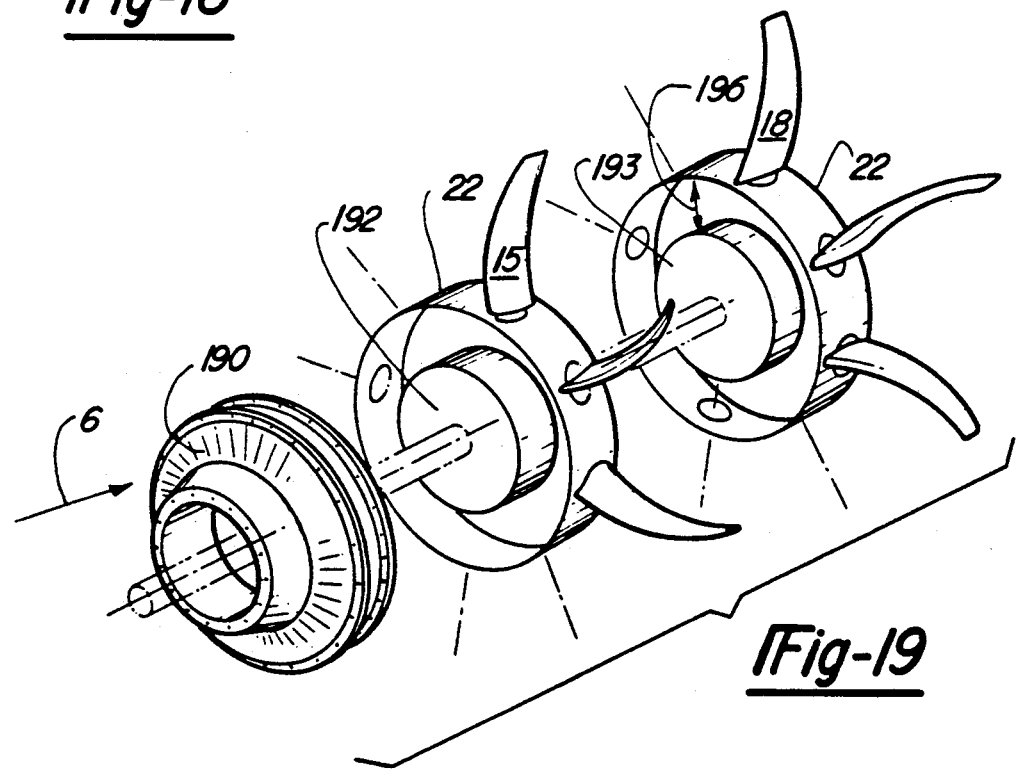
FIG. 19 illustrates a counterrotating propeller system, driven by a speed reduction gear box, with which the invention can be used.

Numerous substitutions and modifications can be undertaken without departing from the true spirit and scope of the invention as defined in the following claims. For example, the preceding discussion has considered a system in which propellers are directly driven by counterrotating turbines. Direct drive is not seen as strictly necessary, as a high-speed turbine 190 in FIG. 19, can be used, in which turbine speed is reduced by speed reduction gear boxes 192 and 193 which drive counterrotating propellers 15 and 18 supported by rings 22. While the problem of thermal expansion described in connection with FIG. 4 may be reduced in the situation shown in FIG. 19, it is likely that annular space 195 analogous to the annular space 27 in FIG. 4 will nevertheless exist. One reason for existence of the annular space 195 in FIG. 19 is that different design considerations will dictate the size and geometry of rings 22 as compared with internal components such as gear box 192. It is believed that brackets similar to brackets 36 in FIG. 4 can be used to mount rings 22 in FIG. 19.

Figure 20:
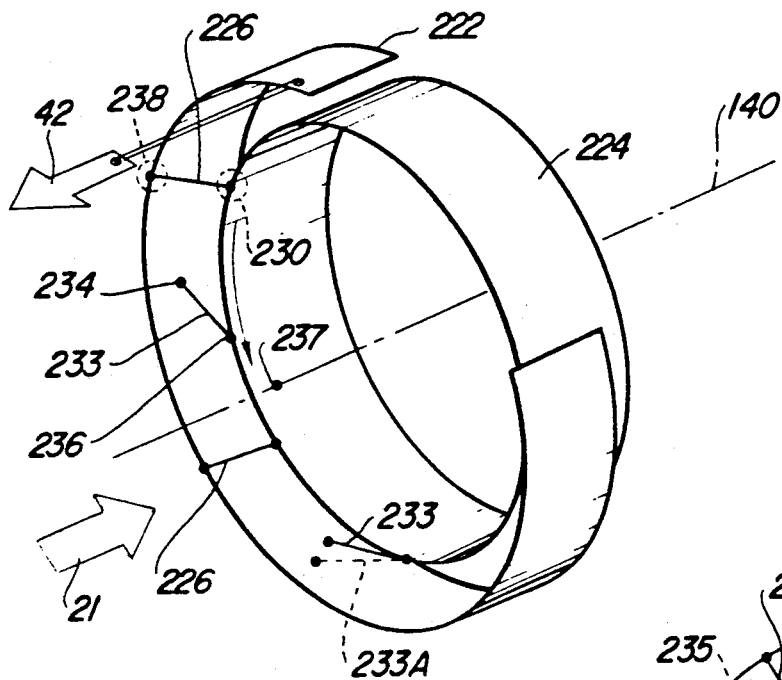
FIG. 20 schematically illustrates another form of the invention.

In another example, the ring 22 and the turbine casing 24 shown in FIG. 4 are schematically illustrated as respective cylinders 222 and 224 in FIG. 20. Brackets 36 in FIG. 4 are now replaced by two types of bracket. Thrust brackets 226 in FIG. 20 extend in a generally axial direction (i.e., nearly parallel with the turbine axis 140) from a forward region 238 on the ring 222 to an aft region 230 on the casing 224. The thrust force 42 applied by the ring 222 places thrust brackets 226 in tension.

Figure 1:
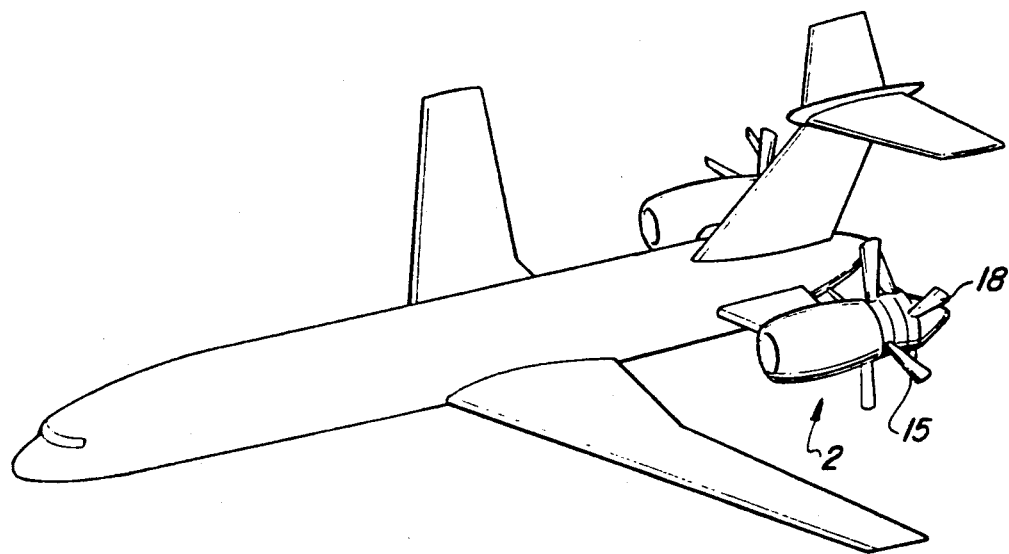
FIG. 1 illustrates a propulsion system for an aircraft with which the present invention can be used.
Figure 21:
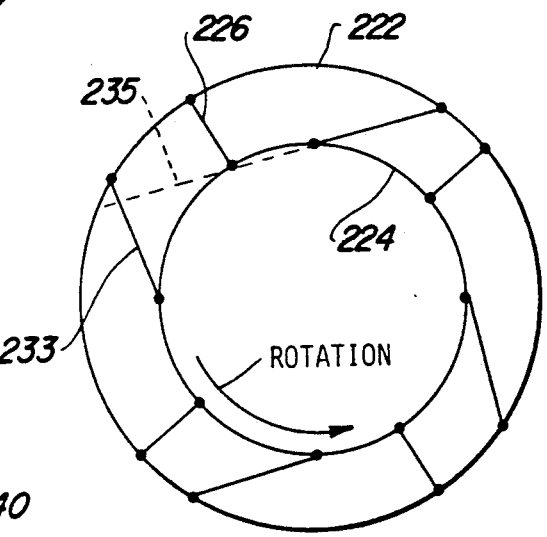
FIG. 21 is a view of FIG. 20, taken along arrow 21.
Figure 22:
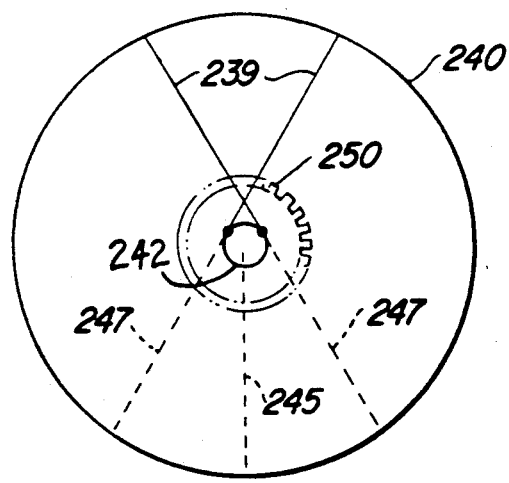
FIG. 22 schematically illustrates a bicycle wheel for the purpose of explaining the function of bicycle spokes.

The other type of bracket is a torque bracket 233, which lies generally along a chord 235 in FIG. 21 of the ring 222. The torque brackets 233 lie approximately in a radial plane. That is, points 234, 236, and 237 in FIG. 20 all lie in the same plane. The torque brackets transmit torque from the turbine casing 224 to the ring 222. The torque is required in order to rotate the propeller blades 15 in FIGS. 1 and 2. From one point of view, the torque brackets perform a function similar to that of spokes on a bicycle wheel: spokes 239 extend from the rim 240 in FIG. 22 and connect nearly tangentially with a hub 242. The spokes do not lie along radius 245, but along chords 247 of the rim. The spokes transmit torque from the hub 242, as when sprocket 250 is driven by the bicycle rider, to the rim 240 The spokes are placed in tension when they transmit the torque. However, bicycle spokes do not receive a large thrust load similar to that indicated by arrow 42 in FIG. 20, which is reacted by the thrust brackets 226.

The thrust brackets 226 and the torque brackets 233 can accommodate the differential thermal expansion of the casing 224 with respect to the ring 222 by two mechanisms First, the thrust brackets 226 will cause a relative axial displacement of the ring 222 with respect to the casing 224, as described above in connection with FIGS. 10 and 11. Second, the torque brackets 233 tolerate the axial displacement by bending into phantom position 233A in FIG. 20. Alternately, a pinned connection or a ball joint (neither is shown) can be used to connect the ends 234 and 236 in FIG. 20 of the torque brackets 233 to the ring 222 and the casing 224 in order to reduce bending.

What is desired to be secured by letters patent is the invention defined in the following claims:

1. An aircraft propulsion system comprising:
 a) a rotor;
 b) a ring surrounding the rotor;
 c) an array of propeller blades supported by the ring; and
 d) a plurality of fasteners for fastening the ring to the rotor which flex under differential thermal growth of the rotor with respect to the ring, said fastener comprising an open trapezoidal configuration having a first and second divergent links extending from the ring to the rotor for undergoing tension in response to a thrust load applied to the rotor.

2. An aircraft propulsion system comprising:
 a) a rotor which is subject to thermal growth;
 b) a ring which surrounds the rotor and carries an array of propeller blades; and
 c) a plurality of divergent fingers extending from the ring to the rotor, which transmit thrust and torque loads between the ring and the rotor, and which flex in response to thermal growth of the rotor.

3. An aircraft propulsion system comprising:
 a) a rotor which includes a plurality of turbine blades which extract energy from a gas stream and rotate the rotor;
 b) a ring surrounding the rotor and carrying an array of propeller blades; and
 c) a plurality of attachment means having first and second legs for attaching the ring to the rotor, and which allow relative radial motion between the ring and the rotor.

4. An aircraft propulsion system comprising:
 a) a rotor;
 b) a polygonal ring surrounding the rotor and carrying a plurality of propeller blades; and
 c) a plurality of integrally interconnected resilient finger pairs, each finger of each pair being divergent from the other and extending between the rotor and the ring.

5. In an aircraft propulsion system having axial, radial, and tangential directions therein, the improvement comprising:
 a) a rotor;
 b) a polygonal ring surrounding the rotor and carrying a plurality of propeller blades; and
 c) a plurality of brackets fastened between the ring and the rotor, each bracket comprising a pair of opposed extensions having a low resistance to relative radial motion between the rotor and the ring, and having a high resistance to both relative axial and tangential motion between the ring and the rotor.

6. An aircraft propulsion system comprising:
 a) a rotor;
 b) a polygonal ring surrounding the rotor and carrying a plurality of removable propeller blades of the variable pitch type; and
 c) a plurality of leaf spring pairs integrally interconnected and extending generally in axial directions, each fastened to both the rotor and the ring.

7. An aircraft propulsion system comprising:
 a) a rotor;
 b) a polygonal ring surrounding the rotor and carrying a plurality of removable propeller blades of the variable pitch type;
 c) a first circumference definable on the rotor;
 d) a second circumference definable on the ring and not lying in a common radial plane with the first circumference; and e) a plurality of bifurcated leaf springs, extending from the first circumference to the second circumference and connecting the ring to the rotor.

8. An aircraft propulsion system comprising:
a) a rotor;
b) a polygonal ring surrounding the rotor and carrying a plurality of removable propeller blades of the variable pitch type;
c) a plurality of brackets, each being generally V-shaped, with the apex of each "V" fastened to the ring and the legs of each "V" fastened to the rotor.

9. An aircraft propulsion system comprising:
a) a rotor;
b) a polygonal ring surrounding the rotor and carrying a plurality of removable propeller blades of the variable pitch type; and
c) a plurality of fasteners for attaching the ring to the rotor, each comprising two or more integrally interconnected leaf springs extending between the rotor and the ring.

10. A system according to claim 9 in which each leaf spring is attached to the rotor at points which are axially displaced from attachment points on the ring.

11. An aircraft propulsion system comprising:
a) a rotor;
b) a ring surrounding the rotor and carrying an array of propeller blades; and
c) means for fastening the ring to the rotor, comprising: a plurality of brackets comprising opposed divergent legs which (i) inhibit relative rotation between the ring and the rotor; (ii) inhibit relative axial motion between the ring and the rotor; and (iii) allow relative radial motion between the ring and the rotor.

12. A system according to claim 11 in which the rotor comprises an array of turbine blades.

13. An aircraft propulsion system comprising:
a) a rotor (24);
b) a ring (22) surround the rotor and carrying an array of propeller blades;
c) a plurality of fasteners (36) for connecting the ring to rotor, each comprising:
(i) a radially inner region (70) for connecting to the rotor;
(ii) a radially outer region (152) for connecting to the ring;
(iii) a bifurcated linkage (63, 66) extending between the inner and outer regions which prevents relative rotational and axial motion between the ring and the rotor, and includes means for allowing relative radial motion between the ring and the rotor.

14. An aircraft propulsion system comprising:
a) a rotor having a generally cylindrical exterior;
b) a ring surrounding the rotor;
c) an array or propeller blades extending from the ring; and
d) a plurality of webs comprising divergent ends extending from the exterior of the rotor to the ring and each including means for tolerating relative thermal growth between the ring and the rotor.

15. A system according to claims 1, 2, 4, 5, 6, 7, 8, 9, 10, 11, 13, or 14 in which the rotor is driven by a turbine which rotates at a greater speed than the rotor in which a speed reduction gear box is connected between the turbine and the rotor.

16. An aircraft propulsion system comprising:
a) a turbine having an outer casing;
b) a polygonal ring surrounding and coaxial with the casing and carrying an array of propeller blades which are variable in pitch; and
c) an apparatus comprising two divergent arms having first ends coupled to said casing and second ends coupled to each other and to said ring which maintains the coaxial status of the ring with the turbine during relative thermal growth of the turbine with respect to the ring.

17. In an aircraft propulsion system which includes an array of propeller blades extending from a ring which absorbs substantially all centrifugal load of the propeller blades and which surrounds a rotor, the improvement comprising:
means for transmitting thrust and torque loads from the ring to the rotor, said means including a pair of divergently articulated members attached to said rotor with opposed ends coupled to each other and said ring.

18. In an aircraft propulsion system which includes an array of propeller blades extending from a ring which absorbs substantially all centrifugal load of the propeller blades and which surrounds a rotor, the improvement comprising:
a) a first array of connectors extending between the rotor and the ring for transmitting thrust forces from the ring to the rotor and which are placed in tension by thrust forces; and
b) a second array of connectors extending between the rotor and
the ring for transmitting torque forces from the ring to the rotor members of said first array corresponding one-for-one with members of said second array and being coupled thereto forming coupled array pairs.

19. In an aircraft propulsion system which includes an array of propeller blades extending from a ring which absorbs substantially all centrifugal load of the propeller blades and which surrounds a rotor, the improvement comprising:
a) means for connecting forward regions of the ring with aft regions of the rotor; and
b) a group of connectors comprising coupled bifurcated elements having divergently articulated arms for coupling to said rotor, said group extending generally along chords of the ring for connecting the ring with the rotor.

20. In an aircraft propulsion system which includes an array of propeller blades extending from a ring which absorbs substantially all centrifugal load of the propeller blades and which surrounds a rotor, the improvement comprising:
a) means for transmitting thrust forces from the ring to the rotor; and
b) a group of spokes connecting the ring to the rotor for transmitting torque forces from the rotor to the ring, each pair said spokes being divergently articulated and coupled to each other, said rotor and said ring.

21. In an aircraft propulsion system which includes an array of propeller blades extending from a ring which absorbs substantially all centrifugal load of the propeller blades and which surrounds a rotor, the improvement comprising:
a) a first group of members in tension extending aftward from the ring to the rotor; and
b) a second group of members in tension extending generally along chords of the ring between the ring and the rotor,
wherein members of said first group are coupled to members of said second group and include means for coupling to said ring and rotor.

* * * * *